United States Patent
Yeou et al.

(10) Patent No.: US 9,711,796 B2
(45) Date of Patent: Jul. 18, 2017

(54) BINDER COMPOSITION FOR SECONDARY BATTERY, CATHODE AND LITHIUM BATTERY INCLUDING THE BINDER COMPOSITION

(71) Applicant: Samsung SDI Co., Ltd., Yongin-si, Gyeonggi-do (KR)

(72) Inventors: Jung-Ock Yeou, Yongin-si (KR); Beom-Wook Lee, Yongin-si (KR); Myung-Seop Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 279 days.

(21) Appl. No.: 14/562,398

(22) Filed: Dec. 5, 2014

(65) Prior Publication Data

US 2015/0200399 A1 Jul. 16, 2015

(30) Foreign Application Priority Data

Jan. 10, 2014 (KR) .................. 10-2014-0003602

(51) Int. Cl.
*H01M 4/62* (2006.01)
*H01M 10/052* (2010.01)
*H01M 4/131* (2010.01)

(52) U.S. Cl.
CPC ............ *H01M 4/622* (2013.01); *H01M 4/131* (2013.01); *H01M 4/623* (2013.01); *H01M 10/052* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2009/0111025 A1 | 4/2009 | Lee et al. | |
| 2009/0136816 A1* | 5/2009 | Kang | B01J 13/22 429/502 |
| 2012/0028105 A1* | 2/2012 | Kumar | H01M 4/131 429/149 |
| 2013/0052525 A1 | 2/2013 | Kageura et al. | |
| 2013/0171521 A1* | 7/2013 | Sugimoto | H01M 4/0404 429/211 |
| 2013/0266873 A1* | 10/2013 | Ishii | H01M 2/1653 429/246 |
| 2014/0011100 A1* | 1/2014 | Lee | H01M 8/1016 429/403 |
| 2014/0205904 A1* | 7/2014 | Sasaki | H01M 4/622 429/217 |
| 2014/0342225 A1* | 11/2014 | Isshiki | H01M 4/139 429/217 |

(Continued)

FOREIGN PATENT DOCUMENTS

JP 8-106897 A 4/1996
JP 8-157677 A 6/1996
(Continued)

*Primary Examiner* — Scott J Chmielecki
(74) *Attorney, Agent, or Firm* — Knobbe Martens Olson & Bear LLP

(57) ABSTRACT

In an aspect, a binder composition for a secondary battery including a first fluoropolymer binder including a tetrafluoroethylene polymer binder, a second fluoropolymer binder including a vinylidene fluoride binder, and a non fluoropolymer binder is provided.

19 Claims, 1 Drawing Sheet

(56) References Cited

U.S. PATENT DOCUMENTS

| | | | |
|---|---|---|---|
| 2015/0050554 A1* | 2/2015 | Fukumine | H01M 4/622 429/217 |
| 2015/0050555 A1* | 2/2015 | Fukumine | H01M 10/0525 429/217 |
| 2015/0236380 A1* | 8/2015 | Garsuch | H01M 10/0567 429/338 |
| 2015/0263386 A1* | 9/2015 | Markevich | H01M 4/386 429/327 |

FOREIGN PATENT DOCUMENTS

| | | |
|---|---|---|
| JP | 9-199130 A | 7/1997 |
| JP | 2003-223895 A | 8/2003 |
| JP | 2003-317722 A | 11/2003 |
| JP | 10-2007-0090502 A | 9/2007 |
| JP | 2013-62241 A | 4/2013 |
| JP | 2013-62257 A | 4/2013 |
| KR | 10-2003-0027969 A | 4/2003 |
| WO | WO 97/27260 A1 | 7/1997 |

* cited by examiner

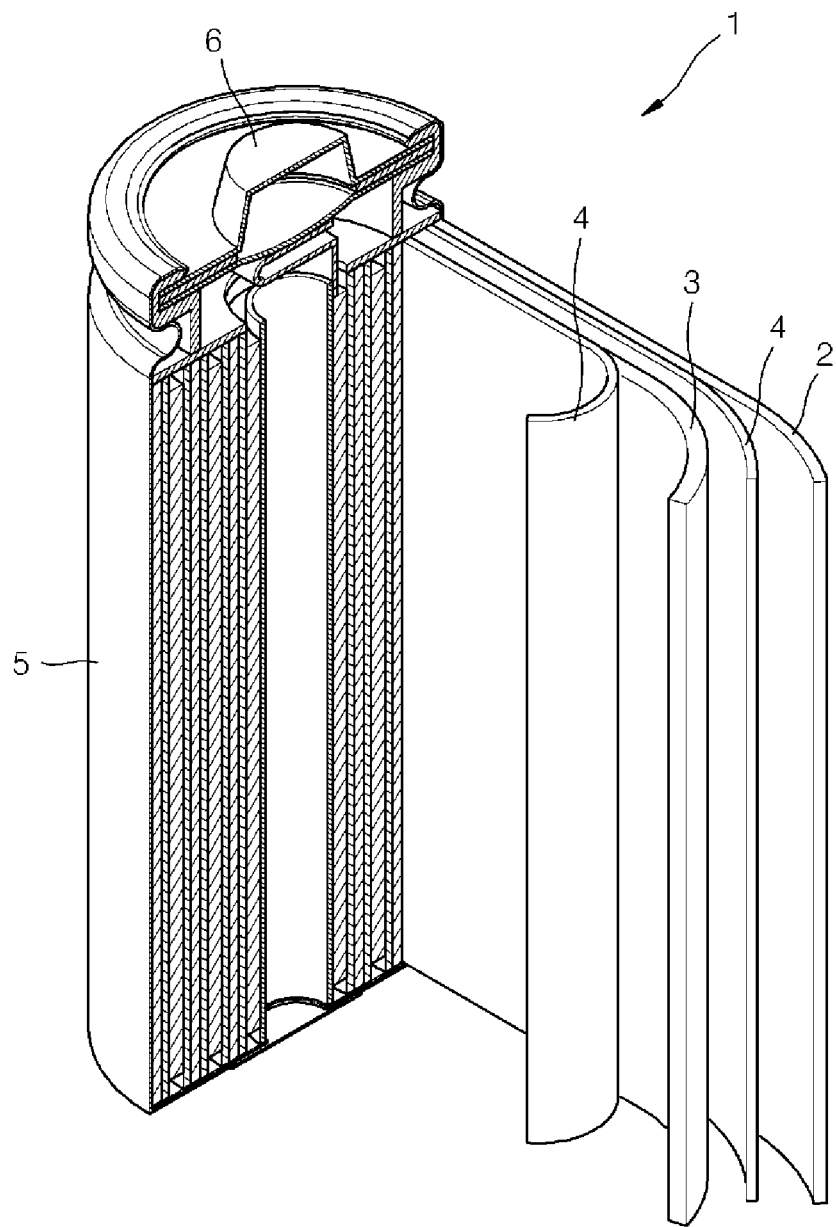

BINDER COMPOSITION FOR SECONDARY BATTERY, CATHODE AND LITHIUM BATTERY INCLUDING THE BINDER COMPOSITION

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2014-0003602, filed on Jan. 10, 2014, in the Korean Intellectual Property Office, the disclosure of which is incorporated herein in its entirety by reference.

BACKGROUND

Field

One or more embodiments of the present disclosure relate to a binder composition for a secondary battery, and a cathode and a lithium battery each including the binder composition.

Description of the Related Technology

Lithium batteries are used in various applications due to their high voltage and high energy density. For example, electric vehicles (HEV or PHEV) need to operate at high temperature, to be charged or discharged with a great amount of electricity, and to be used for a long period of time. Accordingly, electric vehicles require lithium secondary batteries with excellent energy density and lifespan characteristics.

To provide lithium batteries with high energy density and excellent lifespan characteristics, an increase in amounts of an electrode active material and a conductive agent and a decrease in an amount of a binder, in an electrode, are required. However, when the amount of the binder decreases, dispersibility and binding force of the electrode active material and/or the conductive agent and flexibility of the electrode active material layer deteriorate. Accordingly, during charging and discharging, the electrode active material may be separated from a current collector and thus, cyclic characteristics may deteriorate. Thus, a binder is required that, even in a small amount, provides dispersibility of electrode active material and/or conductive agent, binding force of an electrode plate, and flexibility of an electrode plate, to an electrode.

For example, a fluoropolymer binder, such as a polar functional group-free polyvinylidene fluoride, swells less with respect to an organic electrolytic solution, and thus, when a battery operates, the binder may contribute to retaining the structure of an electrode and an active material may have improved dispersibility. However, such a fluoropolymer binder shows poor properties in terms of dispersibility of a conductive agent, binding force of an electrode plate, and flexibility of an electrode plate.

A non fluoropolymer binder, such as a hydrogenated acrylonitrile-butadiene binder, may have, compared to a fluoropolymer binder, improved dispersibility of a conductive agent, improved flexibility of an electrode plate, and improved binding force of an electrode plate. However, the non fluoropolymer binder swells too much with respect to an electrolytic solution. Accordingly, the non fluoropolymer binder is needed to be used in a restricted amount.

Thus, a binder is required that has improved binding force and flexibility at the same time to improve energy density and lifespan characteristics of a lithium battery.

SUMMARY OF CERTAIN INVENTIVE ASPECTS

One or more embodiments of the present disclosure provide a binder composition for a secondary battery, having improved binding force and flexibility and a novel composition.

One or more embodiments of the present disclosure provide a cathode including the binder composition.

One or more embodiments of the present disclosure provide a lithium battery including the cathode.

A binder composition for a secondary battery according to an embodiment of the present disclosure includes: a first fluoropolymer binder including a tetrafluoroethylene polymer binder; a second fluoropolymer binder including a vinylidene fluoride binder; and a non fluoropolymer binder including a repeating unit derived from an acryl monomer and a repeating unit derived from an olefin monomer.

A cathode according to an embodiment of the present disclosure includes: a cathode active material; a conductive agent; and the binder composition.

A lithium battery according to an embodiment of the present disclosure includes the cathode.

BRIEF DESCRIPTION OF THE DRAWINGS

These and/or other aspects will become apparent and more readily appreciated from the following description of the embodiments, taken in conjunction with FIG. 1 which is a schematic view of a lithium battery according to an embodiment of the present disclosure.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, a binder composition for a secondary battery according to an embodiment of the present disclosure, a cathode including the binder composition, and a lithium battery including the cathode will be described in detail.

When a typical binder for a secondary battery, such as a fluoropolymer binder, is used, binding force of an electrode plate, flexibility of an electrode plate, and dispersibility of a conductive agent decrease. It has surprisingly been found that when a tetrafluoroethylene polymer binder and a non fluoropolymer binder including a repeating unit derived from an acryl monomer and a repeating unit derived from an olefin monomer are appropriately mixed with the vinylidene fluoride binder in preparing a binder composition for a secondary battery, the prepared binder provides flexibility of an electrode plate, binding force of an electrode plate, and dispersibility of the conductive agent, leading to manufacturing of a lithium battery having improved energy density and lifespan characteristics.

A binder composition for a second battery according to an embodiment of the present invention includes a first fluoropolymer binder including a tetrafluoroethylene polymer binder, a second fluoropolymer binder including a vinylidene fluoride binder, and a non fluoropolymer binder including a repeating unit derived from an acryl monomer and a repeating unit derived from an olefin monomer. The binder composition for a secondary battery includes the first fluoropolymer binder that provides excellent flexibility of an electrode plate and swells less with respect to an electrolyic solution, the second fluoropolymer binder that retains the structure of an electrode during operation of a battery, and the non fluoropolymer binder including a repeating unit derived from an acryl monomer and a repeating unit derived from an olefin monomer that improves flexibility of an electrode plate, dispersibility of the conductive agent, and improved binding force of an electrode plate. Accordingly, a lithium battery including the binder composition for a secondary battery may have improved binding force, flexibility, and dispersibility of a conductive agent, and thus, improved cyclic characteristics. A lithium battery including the binder composition may have improved cyclic characteristics at a high voltage of 4.3 or more. In some embodiments, the non fluoropolymer binder is a hydrogenated acrylonitrile-butadiene binder, the first fluoropolymer binder is a tetrafluorothylene polymer binder and the second fluoropolymer binder is a polyvinylidene fluoride.

In particular, since the binder composition for a second battery includes the first fluoropolymer binder including a tetrafluoroethylene polymer binder and the non fluoropolymer binder including a repeating unit derived from an acryl monomer and a repeating unit derived from an olefin monomer, an electrode formed using the binder composition may include an electrode active layer having high mixture density and an increased thickness, thereby leading to manufacturing of a lithium battery with high energy density and improved lifespan characteristics.

In some embodiments, the first fluoropolymer binder in the binder composition may be a copolymer of a tetrafluoroethylene monomer and other monomers. A homopolymer including only the tetrafluoroethylene monomer may have poor flexibility. In some embodiments, the other monomers used together with tetrafluoroethylene monomer are at least one fluorine-containing monomer selected from vinylidene-fluoride, hexafluoropropylene, chlorotrifluoroethylene, and perfluoroalkylvinylether.

For example, the tetrafluoroethylene polymer binder that is the first fluoropolymer binder may be a tetrafluoroethylene-vinylidenefluoride copolymer, tetrafluoroethylene-hexafluoropropylene copolymer, tetrafluoroethylene-chlorotrifluoroethylene copolymer, or tetrafluoroethylene-perfluoroalkylvinylether.

In some embodiments, the first fluoropolymer binder may have, compared to a typical vinylidene fluoride binder, improved stability and flexibility at high voltage. The typical vinylidene fluoride binder may not include a polar functional group.

In some embodiments of the binder composition, the first fluoropolymer binder may additionally include a polar functional group. Due to the inclusion of the additional polar functional group, binding force of an electrode plate at a cathode may improve.

In some embodiments of the binder composition, the polar functional group of the first fluoropolymer binder may be at least one selected from the group consisting of a carboxylic acid group (—COOH), a sulfonic acid group (—SO$_3$H), a phosphoric acid group (—PO$_4$H$_2$), an acid anhydride group, and a hydroxy group (—OH), and a salt thereof, but is not limited thereto, and the polar functional group may be any of various materials that are used as a polar functional group in the art.

For example, the introduction of the polar functional group into the first fluoropolymer binder may be performed by polymerizing a monomer including a carboxylic acid group, a monomer including a sulfonic acid group, a monomer including a phosphoric acid group, a monomer including an acid anhydride group, a monomer including a hydroxy group, or a monomer including salts of the foregoing groups.

Examples of a monomer including a carboxylic acid group are a monocarboxylic acid and a derivative thereof, and a dicarboxylic acid and a derivative thereof. Examples of the monocarboxylic acid are an acrylic acid, a methacrylic acid, and a chrotonic acid. Examples of the derivative of the monocarboxylic acid are a 2-ethylacrylic acid, isochrotonic acid, a α-acetoxyacrylic acid, a β-trans-aryloxyacrylic acid, a α-chloro-β-E-methoxy acrylic acid, and a β-diaminoacrylic acid. Examples of the dicarboxylic acid are a maleic acid, a fumalic acid, and an itaconic acid. Examples of the derivative of a dicarboxylic acid are methyl maleic acid, dimethyl maleic acid, phenyl maleic acid, chloro maleic acid, dichloro maleic acid, or fluoromaleic acid; and a maleic acid ester, such as diphenyl maleate, nonyl maleate, decyl maleate, dodecyl maleate, octadecyl maleate, or a fluoroalkyl maleate. Also, an acid anhydride that produces a carboxylic acid by hydrolysis may be used. Examples of an acid anhydride of the dicarboxylic acid are an maleic anhydride, an acrylic anhydride, a methylmaleic anhydride, and a dimethylmaleic anhydride. Also, a monoester and a diester of α,β-ethylenically unsaturated polyvalent carboxylic acid, such as a monoethyl maleate, diethyl maleate, monobutyl maleate, dibutyl maleate, monoethyl fumareate, diethyl fumareate, monobutyl fumareate, dibutyl fumareate, monocyclohexyl fumareate, dicyclohexyl fumareate, monoethyl itaconate, diethyl itaconate, monobutyl itaconate, or dibutyl itaconate, may be further used.

Examples of a monomer having a sulfonic acid group are a vinylsulfonic acid, a methyl vinylsulfonic acid, a (meth)allylsulfonic acid, a styrenesulfonic acid, a (meth)acrylic acid-2-ethyl sulfonic acid, a 2-acrylamid-2-methylpropane-sulfonic acid, and a 3-allyloxy-2-hydroxypropanesulfonic acid.

Examples of a monomer having a phosphoric acid group are phosphate2-(meth)acryloyloxyethyl, phosphoric acid methyl-2-(meth)acryloyloxyethyl, and phosphoric acid ethyl-(meth)acryloyloxyethyl.

Examples of a monomer having a hydroxyl group are an ethylenically unsaturated alcohol, such as (meth)allylalcohol, 3-butene-1-ol, or 5-hexene-1-ol; alkanolesters of an ethylenically unsaturated carboxylic acid, such as acrylic acid-2-hydroxyethyl, acrylic acid-2-hydroxypropyl, methacrylic acid-2-hydroxyethyl, methacrylic acid-2-hydroxypropyl, maleic acid di-2-hydroxyethyl, maleic acid di-4-hydroxybutyl, or itaconic acid di2-hydroxypropyl; an ester of polyalkyleneglycol and (meth)acrylic acid represented by CH$_2$=CR$^1$—COO—(C$_n$H$_{2n}$O)$_m$—H (m indicates an integer of 2 to 9, n indicates an integer of 2 to 4, and R$^1$ indicates a hydrogen or a methyl group); a mono(meth)ester acrylic acid of a dihydroxyester of a dicarboxylic acid, such as 2-hydroxyethyl-2'-(meth)acryloyloxyphthalate, or 2-hydroxyethyl-2'-(meth)acryloyloxysuccinate; vinylether, such as 2-hydroxyethylvinylether or 2-hydroxypropylvinylether; a mono(meth)allyl ether of alkyleneglycol, such as (meth)allyl-2-hydroxyethylether, (meth)allyl-2-hydroxypropylether, (meth)allyl-3-hydroxypropylether, (meth)allyl-2-hydroxy butylether, (meth)allyl-3-hydroxybutylether, (meth)allyl-4-hydroxybutylether, or (meth)allyl-6-hydroxyhexylether; polyoxyalkyleneglycol(meth) monoallylether, such as diethyleneglycol mono(meth)allylether or dipropyleneglycolmono(meth)allylether; mono (meth)allylether of a halogen and hydroxy substituent of (poly)alkyleneglycol, such as glycerin mono(meth)allylether, (meth)allyl-2-chloro-3-hydroxypropylether, or (meth)allyl-2-hydroxy-3-chloropropylether; a mono(meth)allylether of polyphenol, such as eugenol or isoeugenol, or a halogen substituent thereof; and (meth)allylthioethers of alkyleneglycol, such as (meth)allyl-2-hydroxyethylthioether or (meth)allyl-2-hydroxypropylthioether.

From among these, in consideration of binding force among cathode active material particles, and binding force between a cathode active material layer and a current collector, a hydrophilic group may be a carboxylic acid group or a sulfonic acid group. In particular, in consideration of high capturing efficiency of a transition metal ion eluted from the cathode active material, the hydrophilic group may be a carboxylic acid group.

In the binder composition for a secondary battery, an amount of the repeating unit including the polar functional group included in the first fluoropolymer binder may be 10 mole % or less. For example, an amount of the repeating unit including the polar functional group included in the first fluoropolymer binder may be in a range of 0 to 9 mol % or less. For example, an amount of the repeating unit including the polar functional group included in the first fluoropolymer binder may be in a range of 0 to 8 mol % or less. For example, an amount of the repeating unit including the polar functional group included in the first fluoropolymer binder may be in a range of 0 to 7 mol % or less. For example, an amount of the repeating unit including the polar functional group included in the first fluoropolymer binder may be in a range of 0 to 5 mol % or less. When the amount of the repeating unit including the polar functional group is too high, flexibility of an electrode plate may decrease.

In some embodiments, a weight average molecular weight of the first fluoropolymer binder in the binder composition for a secondary battery may be 100,000 g/mol or more. For example, a weight average molecular weight of the first fluoropolymer binder may be in a range of about 100,000 to about 1,500,000 g/mol. For example, a weight average molecular weight of the first fluoropolymer binder may be in a range of about 300,000 to about 1,500,000 g/mol. For example, a weight average molecular weight of the first fluoropolymer binder may be in a range of about 500,000 to about 1,500,000 g/mol. The weight average molecular weight is a calculation result with respect to polystyrene standard obtained by gel permeation chromatography. Within these weight average molecular weight ranges of the first fluoropolymer binder, binding force of an electrode plate may be further improved. When the weight average molecular weight is too small, stability of the slurry may decrease, and when the weight average molecular weight is too high, manufacturing of the electrode is difficult.

In some embodiments, an amount of the tetrafluoroethylene monomer unit in the first fluoropolymer binder may be 10 mol % or more. For example, an amount of the tetrafluoroethylene monomer unit in the first fluoropolymer binder may be 30 mol % or more. For example, an amount of the tetrafluoroethylene monomer unit in the first fluoropolymer binder may be 50 mol % or more. For example, an amount of the tetrafluoroethylene monomer unit in the first fluoropolymer binder may be 70 mol % or more. For example, an amount of the tetrafluoroethylene monomer unit in the first fluoropolymer binder may be 90 mol % or more.

In some embodiments, an amount of the first fluoropolymer binder in the binder composition for a secondary battery may be, based on a total weight of the binder composition, in a range of about 3 weight % to about 27 weight %. For example, an amount of the first fluoropolymer binder may be, based on a total weight of the binder composition, in a range of about 5 weight % to about 25 weight %. When the amount of the first fluoropolymer binder is less than 3 weight %, flexibility of an electrode plate may decrease, and when the amount of the first fluoropolymer binder is greater than 27 weight %, binding force of an electrode plate may decrease and thus cracking of an electrode material layer (i.e., electrode mixture) may occur.

In some embodiments of the binder composition for a secondary battery, the second fluoropolymer binder including the vinylidine fluoride binder may be a vinylidine binder that does not include a polar functional group. The vinylidine binder that does not include a polar functional group may be a typical vinylidine fluoride binder.

For example, the second fluoropolymer binder may be a homopolymer of a vinylidene fluoride monomer, or a copolymer of a vinylidene fluoride monomer and at least one fluorine-containing monomer selected from hexafluoropropylene, chlorotrifluoroethylene, and perfluoroalkylvinylether. For example, the vinylidine monomer may be a vinylidene fluoride homopolymer, a vinylidene fluoride-hexafluoropropylene copolymer, or a vinylidene fluoride-chlorotrifluoroethylene copolymer.

For example, in the binder composition for a secondary battery, the second fluoropolymer binder may include 50 mol % or more of the vinylidene fluoride monomer unit. For example, the second fluoropolymer binder may include 60 mol % or more of the vinylidene fluoride monomer unit. For example, the second fluoropolymer binder may include 70 mol % or more of the vinylidene fluoride monomer unit. For example, the second fluoropolymer binder may include 80 mol % or more of the vinylidene fluoride monomer unit. For example, the second fluoropolymer binder may include 90 mol % or more of the vinylidene fluoride monomer unit.

In some embodiments, an amount of the second fluoropolymer binder in the binder composition for a secondary battery may be, based on a total weight of the binder composition, in a range of about 46 weight % to about 94 weight %. For example, an amount of the second fluoropolymer binder may be, based on a total weight of the binder composition, in a range of about 60 weight % to about 90 weight %. In some embodiments, an amount of the second fluoropolymer binder may be in a range of about 70 weight % to about 85 weight % based on 100 parts by weight of a total weight of the binder composition. When the amount of the second fluoropolymer binder is less than 46 weight %, the active material slurry of an electrode may have low stability, and when the amount of the second fluoropolymer binder is higher than 94 weight %, flexibility and binding force of the electrode active material layer may decrease and dispersibility of a conductive agent may decrease.

In some embodiments, a weight average molecular weight of the second fluoropolymer binder in the binder composition for a secondary battery may be 10,000 g/mol or more. For example, a weight average molecular weight of the second fluoropolymer binder may be in a range of about 100,000 to about 1,500,000 g/mol. For example, a weight average molecular weight of the second fluoropolymer binder may be in a range of about 200,000 to about 1,200,000 g/mol. For example, a weight average molecular weight of the second fluoropolymer binder may be in a range of about 300,000 to about 1,000,000 g/mol. Within these weight average molecular weights of the second fluoropolymer binder, stability of the electrode active material slurry may improve, and dispersibility of an active material in the electrode active material slurry may further improve.

In some embodiments, the non fluoropolymer binder in the binder composition for a second battery may include a repeating unit derived from an acryl monomer and a repeating unit derived from an olefin monomer.

In some embodiments, the acryl monomer in the non fluoropolymer binder may be, for example, an acrylic acid alkylester, such as methylacrylate, ethylacrylate, n-propylacrylate, isopropylacrylate, n-butylacrylate, t-butylacrylate, pentylacrylate, hexylacrylate, heptylacrylate, octylacrylate, 2-ethylhexylacrylate, nonylacrylate, decylacrylate, laurylacrylate, n-tetra decylacrylate, or stearylacrylate; a methacrylic acid alkylester, such as methylmethacrylate, ethylmethacrylate, n-propylmethacrylate, isopropylmethacrylate, n-butylmethacrylic acid, t-butylmethacrylic acid, pentylmethacrylate, hexylmethacrylate, heptylmethacrylate, octylmethacrylate, 2-ethylhexylmethacrylate, nonylmethacrylate, decylmethacrylate, laurylmethacrylate, n-tetradecylmethacrylate, or stearylmethacrylate; di(meth)acrylic acid ester, such as ethylenedi(meth)acrylate, diethyleneglycoldi(meth)acrylate, or ethyleneglycoldi(meth)acrylate; and multifunctional ethylenically unsaturated monomer, such as trimethylolpropantri(meth)acrylate; but are not limited thereto. For example, the acryl monomer may be any of various materials that are used as an acryl monomer in the art. These materials may be used alone or in combination thereof.

Examples of the olefin monomer in the non fluoropolymer binder may be a non-conjugated diene monomer, such as 1,4-pentadiene, 1,4-hexadiene, vinylnorbornene, or dicyclopentadiene; an α-olefin monomer, such as ethylene, propylene, 1-butene, 4-methyl-1-pentene, 1-hexene, or 1-octene, but are not limited thereto, and the olefin monomer may be any of various materials that are used as an olefin monomer in the art. These materials may be used alone or in combination thereof.

For example, the non fluoropolymer binder may be a poly(ethylene-acrylate) binder, a poly(propylene-acrylate) binder, or a poly(butylene-acrylate) binder.

In some embodiments, the poly(ethylene-acrylate) binder may be, for example, poly(ethylene-methyl(meth)acrylate), poly(ethylene-ethyl(meth)acrylate), poly(ethylene-propyl(meth)acrylate), poly(ethylene-butyl(meth)acrylate), poly(ethylene-2-ethylhexyl(meth)acrylate), or a copolymer of these materials and at least one of acrylonitrile and (meth)acrylic acid.

In some embodiments, the poly(propylene-acrylate) binder may be, for example, poly(propylene-methyl(meth)acrylate), poly(propylene-ethyl(meth)acrylate), poly(propylene-propyl(meth)acrylate), poly(propylene-butyl(meth)acrylate), poly(propylene-2-ethylhexyl(meth)acrylate), or a copolymer of these materials and at least one of acrylonitrile and (meth)acrylic acid.

In some embodiments, the poly(butylene-acrylate) binder may be, for example, poly(butylene-methyl(meth)acrylate), poly(butylene-ethyl(meth)acrylate), poly(butylene-propyl(meth)acrylate), poly(butylene-butyl(meth)acrylate), poly(butylene-2-ethylhexyl(meth)acrylate), or a copolymer of these materials and at least one of acrylonitrile and (meth)acrylic acid.

For example, the non fluoropolymer binder may be poly(ethylene-acrylonitrile), poly(ethylene-acrylonitrile-(meth)acrylic acid), poly(prothylene-acrylonitrile), poly(prothylene-acrylonitrile-(meth)acrylic acid), poly(butylene-acrylonitrile), or poly(butylene-acrylonitrile-(meth)acrylic acid).

In some embodiments, an amount of a repeating unit derived from the an acryl monomer in the non fluoropolymer binder may be in a range of about 1 weight % to about 70 weight %, for example, about 2 weight % to about 50 weight %, for example, about 5 weight % to about 30 weight %, for example, about 10 weight % to about 25 weight %. When the amount of the repeating unit derived from the acryl monomer in the non fluoropolymer binder is too high, solubility of the binder with respect to an electrolytic solution increases, and thus cyclic characteristics of a battery may decrease. Also, when the amount of the repeating unit derived from the acryl monomer in the non fluoropolymer binder is too low, dispersibility of an electrode active material may decrease and thus, appropriate cathode active material slurry may not be obtained, leading to a decrease in homogeneity of an obtained electrode.

For example, the repeating unit derived from the acryl monomer in the non fluoropolymer binder may include a nitrile group. Since the non fluoropolymer binder includes a repeating unit including a nitrile group, dispersibility of an electrode active material in an electrode active material slurry for forming an electrode active material layer may improve, and thus, the slurry may be preserved in a stable state for a long period of time. Also, flexibility of the electrode active material layer may improve.

For example, the repeating unit derived from the olefin monomer in the non fluoropolymer binder may include a conjugated diene monomer. In the non fluoropolymer binder, a repeating unit derived from a conjugated diene monomer may be a repeating unit having a linear alkylene structure. In a polymer that constitutes the non fluoropolymer binder, a repeating unit having a linear alkylene structure may have 4 or more carbon atoms, and the number of carbon atoms may be, for example, in a range of 4 to 16, and for example, in a range of 4 to 12. For example, the conjugated diene monomer may be a 1,3-butadiene.

When a repeating unit having a non-polar linear alkylene structure is introduced into a polymer that constitutes the non fluoropolymer binder, dispersibility of a conductive agent, which is added to the electrode active material slurry, improves and thus, uniform electrode may be easily manufactured. Also, since a conductive agent is homogeneously dispersed in an electrode, internal resistance of a cathode may decrease, and as a result, cyclic characteristics and output characteristics of a lithium battery including the cathode may improve. Also, since the linear alkylene repeating unit is introduced, swelling of an electrode with respect to an electrolytic solution may be appropriately adjusted and thus, characteristics of a battery may improve.

In some embodiments, an amount of the repeating unit having the linear alkylene structure having four or more carbon atoms in the non fluoropolymer binder may be in a range of about 30 to about 99 weight %, for example about 50 to about 98 weight %, for example about 70 to about 95 weight %, or for example, about 75 weight % to about 90 weight %.

The non fluoropolymer binder may additionally include a repeating unit including a polar functional group. The polar functional group may be a functional group that generates protons in an aqueous solvent, or a salt prepared by substituting a proton with a cation, and a detailed example thereof is a carboxylic acid group, a sulfonic acid group, a phosphoric acid group, a hydroxyl group, or a salt thereof. Due to the introduction of the polar functional group into a polymer that constitutes the non fluoropolymer binder, binding force may improve.

In some embodiments, an amount of the repeating unit including the polar functional group in the non fluoropolymer binder may be in a range of about 0.05 to about 10 weight %, for example, about 0.1 to about 8 weight %, or for example, about 1 to about 6 weight %.

In some embodiments, an iodine value of the non fluoropolymer binder may be 100 or less. The iodine value of the non fluoropolymer binder may be, for example, higher than about 0 to about 90 mg/100 mg, for example, higher than about 0 to about 30 mg/100 mg, for example, higher than about 0 to about 10 mg/100 mg. When the iodine value of the non fluoropolymer binder is higher than 100 mg, unsaturated bond included in the binder may lead to a decrease in stability at oxidation potential, thereby leading to a decrease in cyclic characteristics. In some embodiments, a weight average molecular amount of the non fluoropolymer binder may be in a range of about 100,000 to about 1,000,000 g/mol. For example, a weight average molecular amount of the non fluoropolymer binder may be in a range of about 100,000 to about 800,000 g/mol, for example, about 100,000 to about 600,000 g/mol, for example, about 100,000 to about 500,000 g/mol, or for example, about 100,000 to about 300,000 g/mol. Within these weight average molecular weight ranges of the non fluoropolymer binder, flexibility of an electrode and dispersibility of a conductive agent may improve.

For example, the non fluoropolymer binder includes a repeating unit having a nitrile group and a repeating unit having a linear alkylene structure having two or more carbon atoms, and may optionally further include a repeating unit having a polar functional group. In some embodiments, the non fluoropolymer binder may be prepared by polymerizing a monomer deriving a repeating unit having a nitrile group, a monomer deriving a repeating unit including a linear alkylene structure, and optionally, a monomer deriving a repeating unit having a polar functional group. Also, the linear alkylene structure unit may be prepared in such a way that a polymer having a repeating unit having an unsaturated bond is obtained and then, hydrogen is added thereto. By controlling the amount of the hydrogen added, the iodine value of the non fluoropolymer binder may be controlled.

In some embodiments, the monomer deriving a repeating unit having a nitrile group in the non fluoropolymer binder may be an α,β-ethylene unsaturated nitrile monomer. In some embodiments, the α,β-ethylene unsaturated nitrile monomer may not be particularly limited and may be any one of various α,β-ethylene unsaturated compounds having a nitrile group, and examples of the α,β-ethylene unsaturated nitrile monomer are α-halogenoacrylonitrile, such as acrylonitrile; α-chloroacrylonitrile, or α-bromoacrylonitrile; and α-alkylacrylonitrile, such as metacrylonitrile. For example, the α,β-ethylenically unsaturated nitrile monomer may be acrylonitrile or metacrylonitrile. These materials may be used alone or in combination thereof.

How the repeating unit having the linear alkylene structure is introduced into the non fluoropolymer binder is not particularly limited. For example, a conjugated diene monomer unit is introduced, and then, a hydrogen is added thereto. In some embodiments, the conjugated diene monomer may be a conjugated diene having four or more carbon atoms, such as 1,3-butadiene, isoprene, 2,3-dimethyl-1,3-butadiene, or 1,3-pentadiene. For example, the conjugated diene monomer may be 1,3-butadiene may be used, and these materials may be used alone or in combination thereof.

In some embodiments, the non fluoropolymer binder may be used in the form of a dispersion solution in which the binder is dispersed in a dispersion medium (water or organic solvent) or in which the binder is dissolved in the dispersion medium (hereinafter, the dispersion solution will be referred to as a binder dispersion solution). The dispersion medium is not particularly limited as long as the medium allows the binder to homogeneously disperse or dissolve. The dispersant may be water that is environmentally friendly and dries quickly. Examples of the organic solvent are cyclic aliphatic hydrocarbons, such as cyclopentane or cyclohexane; aromatic hydrocarbons, such as toluene, xylene, or ethylbenzene; ketones, such as acetone, ethylmethylketone, diisopropylketone, cyclohexanone, methylcyclohexanone, or ethylcyclohexanone; chlorinated aliphatic hydrocarbons, such as methylenechloride, chloroform, or carbon tetrachloride; esters, such as ethylacetate, butylacetate, γ-butylolactone, or ε-caprolactone; acetonitriles, such as acetonitrile or propionitrile; ethers, such as tetrahydrofuran or ethyleneglycoldiethylether; alcohols, such as methanol, ethanol, isopropanol, ethyleneglycol, ethyleneglycol monomethyl ether; and amides, such as N-methyl pyrrolidone or N,N-dimethylformimide. These dispersants may be used alone or in combination thereof. For example, water or N-methylpyrrolidone (NMP) may be chosen for use as the dispersant because water and NMP suppress evaporation of an electrode active material slurry to improve flatness of an electrode.

When the non fluoropolymer binder is dispersed in the form of particles in the dispersion medium, an average particle diameter (dispersion particle diameter) of the binder dispersed in the particle state may be in a range of about 10 to about 500 nm, for example about 20 to about 300 nm, or for example about 50 to about 200 nm. Within these average particle diameter ranges of the binder, an electrode formed using the binder may have improved stiffness and flexibility.

When the non fluoropolymer binder is dispersed in the form of particles in a dispersion medium, a solid content of the binder dispersion solution may be in a range of, for example, about 15 to about 70 weight %, for example, about 20 to about 65 weight %, or for example, about 30 to about 60 weight %. Within these solid content ranges, the electrode active material slurry may be easily prepared.

Glass transition temperature (Tg) of the non fluoropolymer binder may be in a range of about −40° C. to about 30° C. For example, a Tg of the non fluoropolymer binder may be in a range of about −40° C. to about 25° C. For example, a Tg of the non fluoropolymer binder may be in a range of about −40° C. to about 20° C. For example, a Tg of the non fluoropolymer binder may be in a range of about −40° C. to about 15° C. For example, a Tg of the non fluoropolymer binder may be in a range of about −40° C. to about 5° C. Within these Tg ranges of the non fluoropolymer binder, an electrode including the non fluoropolymer binder may have improved stiffness and flexibility. The Tg of the non fluoropolymer binder may be appropriately controlled by combining various monomers. When the Tg of the non fluoropolymer binder is lower than −40° C., an electrode plate may have a sticky surface, causing difficulties in manufacturing a battery, and when the Tg of the non fluoropolymer binder is higher than 30° C., flexibility of an electrode may decrease.

In some embodiments, an amount of the non fluoropolymer binder in the binder composition for a second battery may be in a range of about 3 weight % to about 27 weight % based on 100 weight % of a total weight of the binder composition. An amount of the non fluoropolymer binder in the binder composition for a second battery may be in a range of about 5 weight % to about 25 weight % based on 100 parts by weight of a total weight of the binder composition. In some embodiments, an amount of the non fluoropolymer binder in the binder composition for a second battery may be in a range of about 10 weight % to about 20 weight % based on 100 parts by weight of a total weight of the binder composition. When the amount of the non fluoropolymer binder is less than 3 weight %, flexibility of an electrode plate and dispersibility of a conductive agent may decrease, and when the amount of the non fluoropolymer binder is higher than 27 weight %, lifespan of lithium battery may decrease because of high swelling of the non fluoropolymer binder with respect to electrolytic solution.

A cathode according to an embodiment of the present invention includes a cathode active material, a conductive agent, and the binder composition for a second battery.

In some embodiments, an amount of the binder composition in the cathode may be in a range of about 0.5 to about 5 parts by weight based on 100 parts by weight of the cathode active material. For example, an amount of the binder composition in the cathode may be in a range of about 0.5 to about 4 parts by weight based on 100 parts by weight of the cathode active material. For example, an amount of the binder composition in the cathode may be in a range of about 0.5 to about 3 parts by weight based on 100 parts by weight of the cathode active material. For example, an amount of the binder composition in the cathode may be in a range of about 0.5 to about 2 parts by weight based on 100 parts by weight of the cathode active material. For example, an amount of the binder composition in the cathode may be in a range of about 0.5 to about 1.5 parts by weight based on 100 parts by weight of the cathode active material. When the amount of the binder composition in the cathode is higher than 5 parts by weight, amounts of an electrode active material and a conductive agent may relatively decrease and thus, discharge capacitance decreases and energy density decreases, and when the amount of the binder composition is less than 0.5 parts by weight, binding force and flexibility of the electrode active material layer may decrease.

In some embodiments, a weight of a cathode mixture in the cathode per unit area may be higher than 40 mg/cm$^2$. For example, a weight of a cathode mixture in the cathode per unit area may be higher than 45 mg/cm$^2$. For example, a weight of a cathode mixture in the cathode per unit area may be higher than 50 mg/cm$^2$. When the weight of a cathode mixture in the cathode per unit area is higher than 40 mg/cm$^2$, the thickness of an active material layer increases, thus, energy density of an electrode may improve. The cathode mixture used herein refers to a cathode active material layer including a cathode active material, a conductive agent, and a binder, prepared by drying the cathode active material slurry.

In some embodiments, a mixture density of the cathode may be 3.5 g/cc or more. For example, a mixture density of the cathode may be 3.7 g/cc or more. For example, a mixture density of the cathode may be 3.9 g/cc or more. For example, a mixture density of the cathode may be 4.0 g/cc or more. For example, a mixture density of the cathode may be 4.1 g/cc or more. For example, a mixture density of the cathode may be 4.2 g/cc or more. When the cathode has 3.5 g/cc or more of the mixture density, energy density of the cathode may improve.

In some embodiments, the cathode may be manufactured by, for example, molding a cathode active material composition including the cathode active material, the conductive agent, and the binder composition for a second battery into a predetermined shape, or coating the cathode active material composition on a current collector, such as a copper foil.

In detail, a cathode active material composition including a cathode active material, a conductive agent, the binder composition described above, and a solvent is prepared. In some embodiments, the cathode active material composition may be directly coated on a metal current collector to prepare a cathode plate. In another embodiment, the cathode active material composition is cast on a separate support, and then, a film exfoliated from the support is laminated on a metal current collector to prepare a cathode plate. The method of forming the cathode is not limited thereto and any other method may also be used to form the cathode.

As the cathode active material, at least one selected from a lithium cobalt oxide, a lithium nickel cobalt, manganese oxide, a lithium nickel cobalt aluminum oxide, a lithium iron phosphate oxide, and lithium manganese oxide may be used. However, the cathode active material is not limited thereto. For example, any one of various materials that are used as a cathode active material in the art may be used.

For example, the cathode active material may be a compound represented by any one of $Li_aA_{1-b}B^1{}_bD^1{}_2$ (wherein $0.90 \leq a \leq 1.8$, and $0 \leq b \leq 0.5$); $Li_aE_{1-b}B^1{}_bO_{2-c}D^1{}_c$ (wherein $0.90 \leq a \leq 1.8$, $0 \leq b \leq 0.5$, and $0 \leq c \leq 0.05$); $LiE_{2-b}B^1{}_bO_{4-c}D^1{}_c$ (wherein $0 \leq b \leq 0.5$, and $0 \leq c \leq 0.05$); $Li_aNi_{1-b-c}Co_bB^1{}_cD^1{}_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB^1{}_cO_{2-\alpha}F^1{}_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB^1{}_cO_{2-\alpha}F^1{}_2$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB^1{}_cD^1{}_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB^1{}_cO_{2-\alpha}F^1{}_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB^1{}_cO_{2-\alpha}F^1{}_2$ (wherein $0.90 \leq a \leq 1.8$, $0 \leq b \leq 0.5$, $0 \leq c \leq 0.05$, and $0 \leq \alpha \leq 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is Ni, Co, Mn, or a combination thereof; $B^1$ is Al, Ni, Co, Mn, Cr, Fe, Mg, Sr, V, a rare-earth element, or a combination thereof; $D^1$ is O (oxygen), F (fluorine), S (sulfur), P (phosphorus), or a combination thereof; E is Co, Mn, or a combination thereof; $F^1$ is F (fluorine), S (sulfur), P (phosphorus), or a combination thereof; G is Al, Cr, Mn, Fe, Mg, La, Ce, Sr, V, or a combination thereof; Q is Ti, Mo, Mn, or a combination thereof; $I^1$ is Cr, V, Fe, Sc, Y, or a combination thereof; and J is V, Cr, Mn, Co, Ni, Cu, or a combination thereof.

These compounds may have a coating layer on their surfaces, or these compounds may be mixed with a compound having a coating layer. The coating layer may include an oxide of a coating element, a hydroxide of a coating element, an oxyhydroxide of a coating element, an oxycarbonate of a coating element, or a hydroxycarbonate of a coating element. These compounds that form the coating layer may be amorphous or crystalline. As a coating element included in the coating layer, Mg, Al, Co, K, Na, Ca, Si, Ti, V, Sn, Ge, Ga, B (boron), As, Zr, or a mixture thereof may be used. In some embodiments, the coating layer may be formed by using any one of various coating methods that are performed using the compounds and the elements and do not affect properties of the cathode active material (for example, spray coating, immersion, or the like). These coating methods are known to one of ordinary skill in the art and thus, are not described in detail herein.

For example, $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0≤x≤0.5, 0≤y≤0.5), $LiFeO_2$, $V_2O_5$, TiS, or MoS may be used.

In some embodiments, the cathode active material may be at least one selected from compounds represented by Formulae 1 to 7 below:

$$pLi_2MO_{3-(1-p)}LiMeO_2 \quad \text{Formula 1}$$

wherein 0<p≤0.8, M is at least one metal selected from the group consisting of Ru, Rh, Pd, Os, Ir, Pt, Mg, Ca, Sr, Ba, Ti, Zr, Nb, Mo, W, Zn, Al, Si, Ni, Mn, Cr, Fe, Mg, Sr, V, and a rare earth element, and Me is at least one metal selected from the group consisting of Ti, V, Cr, Mn, Fe, Co, Ni, Cu, Al, Mg, Zr, and B (boron), $$Li[Li_xMe_y]O_{2+d} \quad \text{Formula 2}$$

wherein x+y=1, 0<x<1, 0≤d≤0.1, and Me is at least one metal selected from Mn, V, Cr, Fe, Co, Ni, Zr, Re, Al, B, Ge, Ru, Sn, Ti, Nb, Mo, and Pt, $$xLi_2MO_{3-y}LiMeO_{2-z}Li_{1+d}M'_{2-d}O_4 \quad \text{Formula 3}$$

wherein x+y+z=1; 0<x<1, 0<y<1, 0<z<1; 0≤d≤0.33, M is at least one metal selected from the group consisting of Mg, Ca, Sr, Ba, Ti, Zr, Nb, Mo, W, Zn, Al, Si, Ni, Mn, Cr, Fe, Mg, Sr, V, and rare earth element, Me is at least one metal selected from the group consisting of Ti, V, Cr, Mn, Fe, Co, Ni, Cu, Al, Mg, Zr, and B (boron), and M' is at least one metal selected from the group consisting of Ti, V, Cr, Mn, Fe, Co, Ni, Cu, Al, Mg, Zr, and B (boron), $$Li_xCo_{1-y}M_yO_{2-\alpha}X_\alpha \quad \text{Formula 4}$$

$$Li_xCo_{1-y-z}Ni_yM_zO_{2-\alpha}X_\alpha \quad \text{Formula 5}$$

$$Li_xMn_{2-y}M_yO_{4-\alpha}X_\alpha \quad \text{Formula 6}$$

$$Li_xCo_{2-y}M_yO_{4-\alpha}X_\alpha \quad \text{Formula 7}$$

$$Li_xMe_yM_zPO_{4-\alpha}X_\alpha \quad \text{Formula 8}$$

wherein in the formulae above, 0.90≤x≤1.1, 0≤y≤0.9, 0≤z≤0.5, 1−y−z>0, 0≤α≤2, Me is at least one metal selected from the group consisting of Ti, V, Cr, Mn, Fe, Co, Ni, Cu, Al, Mg, Zr, and B (boron), M is at least one metal selected from the group consisting of Mg, Ca, Sr, Ba, Ti, Zr, Nb, Mo, W, Zn, Al, Si, Ni, Mn, Cr, Fe, Mg, Sr, V, and a rare earth element, and X is at least one metal selected from the group consisting of O (oxygen), F (fluorine), S (sulfur), and P (phosphorus).

Examples of the conductive agent are acetylene black, ketjen black, natural graphite, artificial graphite, carbon black, carbon fiber, and metal powder and metal fiber of copper, nickel, aluminum, or silver, and at least one of conductive materials, such as polyphenylene derivatives. However, the conductive agent is not limited thereto, and may be any one of various materials that are used as a conductive agent in the art. Also, the crystalline carbonaceous material may be additionally used for use as the conductive agent.

A typical binder may be additionally used in addition to the binder composition for a second battery. Examples of the typical binder are a vinylidene fluoride/hexafluoropropylene copolymer, polyvinylidenefluoride (PVDF), polyacrylonitrile, polymethylmetacrylate, polytetrafluoroethylene, a mixture thereof, and a styrene butadiene rubber-based polymer, but are not limited thereto, and any one of materials that are used as a binder in the art may be used herein.

As the solvent, N-methylpyrrolidone, acetone, or water may be used. However, the solvent is not limited thereto, and any one of various materials that are used in the art may be used herein.

Amounts of the cathode active material, the conductive agent, the typical binder, and the solvent may be the same as used in a typical lithium battery. According to the purpose and structure of a lithium battery, one or more of the conductive agent, the binder, and the solvent may not be used.

A lithium battery according to an embodiment of the present disclosure includes the cathode. An example of a method of manufacturing a lithium battery is described below.

First, a cathode is prepared by using the method described above.

Then, an anode active material composition including a anode active material, a conductive agent, a binder, and a solvent is prepared. The anode active material composition is directly coated and dried on the metal current collector to prepare an anode plate. According to another embodiment of the present disclosure, the anode active material composition is cast on a separator support and a film exfoliated from the support is laminated on a metal current collector to prepare an anode electrode plate.

In some embodiments, the anode active material may be a non-carbonaceous material. In some embodiments, the anode active material may include at least one selected from a metal that is alloyable with lithium, an alloy of a metal that is alloyable with lithium, and an oxide of a metal that is alloyable with lithium.

For example, the lithium-alloyable metal may be Si, Sn, Al, Ge, Pb, Bi, Sb, Si—Y alloy (where Y is alkali metal, alkali earth metal, a Group 13 element, a Group 16 element, transition metal, rare earth element, or a combination thereof element and is not Si), or Sn—Y alloy (where Y is alkali metal, alkali earth metal, a Group 13 element, a Group 16 element, transition metal, rare earth element, or a combination thereof element and is not Sn). In some embodiments, the element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be titanium oxide, a vanadium oxide, or a lithium vanadium oxide.

For example, the transition metal oxide may be $SnO_2$, $SiO_x$ (0<x<2), or the like.

For example, the anode active material may be at least one selected from Si, Sn, Pb, Ge, Al, $SiO_x$ (0<x≤2), $SnO_y$ (0<y≤2), $Li_4Ti_5O_{12}$, $TiO_2$, $LiTiO_3$, and $Li_2Ti_3O_7$, but is not limited thereto, and any one of various non-carbonaceous anode active materials that are used in the art may be used herein.

Also, a composite of the non-carbonaceous anode active material and a carbonaceous material may be used. Also, in addition to the non-carbonaceous material, a carbonaceous material may be additionally included.

In some embodiments, the carbonaceous material may be a crystalline carbon, an amorphous carbon, or a mixture thereof. In some embodiments, the crystalline carbon may be natural or artificial graphite that is non-shaped, tabular, flake, spherical, or fibrous, and the amorphous carbon may be soft carbon (cold calcined carbon) or hard carbon, mesophase pitch carbide, calcined corks, or the like.

In some embodiments, the conductive agent, the binder, and the solvent included in the anode active material composition may be the same as those used in the cathode active material composition. Also, a plasticizer may be further included in at least one of the cathode active material composition and the anode active material composition to form pores in an electrode plate.

Amounts of the anode active material, the conductive agent, the typical binder, and the solvent may be the same as used in a typical lithium battery. According to the purpose and structure of a lithium battery, one or more of the conductive agent, the binder, and the solvent may not be used.

Then, a separator which is to be inserted between the cathode and the anode is prepared. The separator may be any one of various materials that are typically used in a lithium battery. A material for forming the separator may be a material that has low resistance to ion migration of an electrolyte and has excellent electrolytic solution retaining capability. For example, the separator forming material may be selected from glass fiber, polyester, polyethylene, polypropylene, polytetrafluoroethylene (PTFE), and a combination thereof, each of which may be in a non-woven fabric or woven fabric form. For example, for use in a lithium ion battery, a rollable separator formed of polypropylene may be used, and for use in a lithium ion polymer battery, a separator that has excellent organic electrolytic solution-retaining capability may be used. For example, these separators may be prepared by using the following method.

In some embodiments, a separator composition is prepared by mixing a polymer resin, a filler, and a solvent. In some embodiments, the separator composition may be directly coated or dried on an electrode to complete the formation of the separator. In some embodiments, the separator composition may be cast on a separate support and then a film separated from the support is laminated on an electrode, thereby completing the formation of the separator.

A polymer resin used in preparing the separator may not be particularly limited, and all the materials used for a binder of an electrode plate may be used. For example, a vinylidene fluoride/hexafluoropropylene copolymer, polyvinylidenefluoride (PVDF), polyacrylonitrile, polymethylmetacrylate, or a mixture thereof may be used.

Then, an electrolyte may be prepared.

For example, the electrolyte may be an organic electrolytic solution. According to an embodiment of the present disclosure, the electrolyte may be solid. For example, boron oxide, lithiumoxynitrite, or the like may be used, but the electrolyte may not be limited thereto, and the electrolyte may be any one of various materials that are used as a solid electrolyte in the art. The solid electrolyte may be formed on an anode by, for example, sputtering.

For example, an organic electrolytic solution may be prepared. The organic electrolytic solution may be prepared by dissolving a lithium salt in an organic solvent.

The organic solvent may be any one of various materials that are used as an organic solvent in the art. For example, the organic solvent may be selected from propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofurane, 2-methyltetrahydrofurane, α-butyrolactone, dioxorane, 4-methyldioxorane, N,N-dimethylformamide, dimethylacetamide, dimethylsufloxide, dioxane, 1,2-dimethoxyethane, sulforane, dichloroethane, chlorobenzene, nitrobenzene, diethyleneglycol, dimethylether, and a combination thereof.

In some embodiments, the lithium salt may be any one of various lithium salts used in the art. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers of 1 to 20, respectively), LiCl, LiI or a mixture thereof may be used.

Referring to FIG. 1, a lithium battery 1 includes a cathode 3, an anode 2, and a separator 4. In some embodiments, the cathode 3, the anode 2, and the separator 4 are wound or folded to be placed in a battery case 5. Subsequently, an organic electrolytic solution is injected into the battery case 5, and the result structure is sealed with a cap assembly 6, thereby completing the manufacturing of the lithium battery 1. In some embodiments, the battery case 5 may be cylindrical, rectangular, and thin-film shape. For example, the lithium battery may be thin-film battery. In some embodiments, the lithium battery may be a lithium ion battery. In some embodiments, the lithium battery may be a lithium polymer battery.

In some embodiments, a separator may be interposed between the cathode and the anode to form a battery assembly. In some embodiments, a plurality of battery assemblies may be stacked or rolled in a bi-cell structure and then impregnated with an organic electrolytic solution, and the obtained result is housed in a pouch, followed by sealing, thereby completing the manufacture of a lithium ion polymer battery.

Also, a plurality of the battery assemblies may be stacked to form a battery pack, and the battery pack may be used in various devices that require high capacitance and high power output. For example, the battery assemblies may be used in a notebook computer, a smartphone, an electric vehicle, or the like.

In particular, a lithium battery may be suitable for use in an electric vehicle (EV) due to its high energy density and lifespan characteristics. For example, the lithium battery is suitable for use in a hybrid car, such as a plug-in hybrid electric vehicle (PHEV).

The embodiments of the present disclosure are described in detail with reference to Examples below. However, Examples are presented herein for illustrative purpose only, and do not limit the scope of the present disclosure.

Preparation of a Binder

Preparation of Cathode and Lithium Battery

Example 1

A cathode active material slurry including a mixture (Umicore) including LCO ($LiCoO_2$) and NCM ($LiNi_{0.3}Co_{0.5}Mn_{0.2}O_2$) at a weight ratio of 8:2, carbon black (Ketchen black ECP, SP5090, Lion Corp., Tokyo, Japan), and a binder at a weight ratio of 97.8:1.2:1 was prepared.

A binder composition was prepared in such a way that the binder of the cathode active material slurry included a first fluoropolymer binder, a second fluoropolymer binder, and a non fluoropolymer binder at a weight ratio of 10:80:10.

In detail, carbon black was added to a non-fluoropolymer binder solution (a binder solution in which a hydrogenated acrylonitrile-butadiene binder was dispersed in NMP, BM-720H, a weight average molecular amount=300,000 g/mol, Tg=−30° C., Nippon Zeon Co. Ltd., Tokyo, Japan), and the mixture was stirred by using a Planetary centrifugal mixer (hereinafter referred to as Thinky mixer, Thinky Corporation, Laguna Hills, Calif., USA) at a rotation rate of 2000 rpm for 5 minutes to prepare a conductive agent slurry.

Then, a second fluoropolymer binder solution (SOLEF 6020, PVDF, weight average molecular amount=700,000 g/mol, Solvay, Belgium) and the cathode active material were added to the conductive agent slurry, and then, the mixture was stirred by using a Thinky mixer at a rotation rate of 2000 rpm for 5 minutes to prepare a first active material slurry.

Subsequently, a first fluoropolymer binder solution (VT471, P(TFE-VDF), weight average molecular weight=350,000 g/mol, Daikin, Osaka, Japan) was added to the first active material slurry, and then, the mixture was stirred by using a Thinky mixer at a rotation rate of 500 rpm for 5 minutes to prepare a second active material slurry.

The second active material slurry was coated on an aluminum foil having a thickness of 12 μm to form a coating film having a thickness of 102 μm, and then dried at a temperature of 110° C. for 2 hours, and pressed to make the thickness thereof to be 71 μm, thereby completing the manufacture of a cathode electrode plate. Then, a coin cell (CR2016 type) having a diameter of 32 mm was prepared.

To manufacture the cell, metal lithium was used as a counter electrode, a polyethylene separator (Star® 20, Asahi Kasei, Tokyo Japan) having a thickness of 20 μm was used as a separator, and 1.15M $LiPF_6$ dissolved in a mixed solvent of ethylenecarbonate (EC):ethylmethylcarbonate (EMC):diethylcarbonate (DEC) (a volumetric ratio of 3:3:4) was used as an electrolyte.

Example 2

A cathode active material slurry, a cathode, and a lithium battery were prepared in the same manner as in Example 1, except that a weight ratio of the first fluoropolymer binder, the second fluoropolymer binder, and the non fluoropolymer binder in the binder composition was 5:80:15.

Example 3

A cathode active material slurry, a cathode, and a lithium battery were prepared in the same manner as in Example 1, except that a weight ratio of the first fluoropolymer binder, the second fluoropolymer binder, and the non fluoropolymer binder in the binder composition was 15:70:15.

Example 4

A cathode active material slurry, a cathode, and a lithium battery were prepared in the same manner as in Example 1, except that a weight ratio of the first fluoropolymer binder, the second fluoropolymer binder, and the non fluoropolymer binder in the binder composition was 25:60:15.

Example 5

A cathode active material slurry, a cathode, and a lithium battery were prepared in the same manner as in Example 1, except that a weight ratio of the first fluoropolymer binder, the second fluoropolymer binder, and the non fluoropolymer binder in the binder composition was 15:60:25.

Example 6

A cathode active material slurry, a cathode, and a lithium battery were prepared in the same manner as in Example 1, except that a weight ratio of the first fluoropolymer binder, the second fluoropolymer binder, and the non fluoropolymer binder in the binder composition was 25:50:25.

Comparative Example 1

A cathode active material slurry, a cathode, and a lithium battery were prepared in the same manner as in Example 1, except that a weight ratio of the first fluoropolymer binder, the second fluoropolymer binder, and the non fluoropolymer binder in the binder composition was 30:40:30.

Comparative Example 2

A cathode active material slurry, a cathode, and a lithium battery were prepared in the same manner as in Example 1, except that a weight ratio of the first fluoropolymer binder, the second fluoropolymer binder, and the non fluoropolymer binder in the binder composition was 15:85:0. It is understood that when a value is listed as zero in a ratio that the number zero is being included to indicate that the corresponding component is not present and should not be interpreted to have a mathematical meaning. For example, the ratio of 15:85:0 in Comparative Example 2 indicates the non fluoropolymer binder is not present.

Comparative Example 3

A cathode active material slurry, a cathode, and a lithium battery were prepared in the same manner as in Example 1, except that a weight ratio of the first fluoropolymer binder, the second fluoropolymer binder, and the non fluoropolymer binder in the binder composition was 0:85:15. It is understood that when a value is listed as zero in a ratio that the number zero is being included to indicate that the corresponding component is not present and should not be interpreted to have a mathematical meaning. For example, the ratio of 0:85:15 in Comparative Example 3 indicates first fluoropolymer binder is not present.

Evaluation Example 1

Binding Force Evaluation (Peel Test)

Each of the cathode plates manufactured according to Examples 1 to 6 and Comparative Examples 1 to 3 was cut to a size of 2.5 cm×10 cm, and the cathode plate was placed on a glass slide in such a way that an active material layer faced the glass slide, and then, the cathode plate was attached to glass slide by using a roller. A part of the cathode plate (i.e., current collector) was separated from the glass slide on which a cathode active material layer is attached and then folded in an opposite direction.

The glass slide on which a cathode active material layer is attached and the folded part of cathode plate (i.e., folded current collector) were separately grabbed by a UTM tester (QC-513A2 of Cometech Co., Ltd., Taichung City, Taiwan), and the glass slide on which a cathode active material layer is attached and the current collector of the cathode plate were pulled at a speed of 100 mm/sec at an angle of 180 degrees to measure binding force.

An average binding force in a section in which pulling force was maintained constant was used as a binding force of the cathode.

Test results are shown in Table 1 below.

Evaluation Example 2

Electrode Plate Resistance Evaluation

Each of the cathode plates prepared according to Examples 1 to 6 and Comparative Examples 1 to 3 was cut to a size of 36Π. A size of 36Π means a circular electrode plate having a diameter of 36 mm. When the cathode plate was brought into contact by using RS1300N (Napson Corporation, Tokyo, Japan), a surface resistance was measured. Ten seconds after the contact, a resistance value was read. In consideration of a weight and a mixture density of a cathode mixture per unit area of the cathode plate, a specific resistance (represented as a specific resistance calculated in consideration of a resistance of an electrode plate and a thickness factor) was calculated. Test results are shown in Table 1 below.

Evaluation Example 3

Electrode Plate Stiffness Evaluation

Each of the cathode plates according to Examples 1 to 6 and Comparative Examples 1 to 3 was cut to a size of 10 mm×20 mm, and the cathode plate was placed between two points spaced apart at an interval of 10 mm by using a three point bending tester (self-manufactured), and a center of the cathode plate was pushed by using the other pointer to perform a bending test. The evaluation speed was 100 mm/min, and the maximum evaluation value was used as a stiffness value. Test results are shown in Table 1 below as the bending stress.

Evaluation Example 4

Slurry Stability Evaluation

Stability of the cathode active material slurries used in Examples 1 to 6 and Comparative Examples 1 to 3 was measured as follows: viscosity of slurry was measured for 3 days using a viscometer, and when the viscosity of slurry changes 20% or more within 3 days, the slurry was evaluated as having poor stability.

Test results are shown in Table 1 below.

Evaluation Example 5

Loading Amount (L/L (mg/cm$^2$)) Evaluation

A weight (L/L) of a cathode mixture per unit area of each of the cathode plates prepared according to Examples 1 to 6 and Comparative Examples 1 to 3 was measured as described below. The loading amount refers to a weight of a cathode mixture per unit area.

14Π of a circular electrode plate was cut and a weight of the cathode mixture (a weight of a current collector was subtracted from a total weight of the cathode plate) was divided by the area of 14Π of the electrode plate. The 14Π of a circular electrode means a circular electrode plate having a diameter of 14 mm.

Test results are shown in Table 1 below.

Evaluation Example 6

Mixture Density Evaluation

Mixture density of cathode plates prepared in Examples 1 to 6 and Comparative Examples 1 to 3 was measured as follows: the loading amount (L/L) measured according to Evaluation Example 5 was divided by a thickness of the cathode mixture (a thickness of a current collector was subtracted from a thickness of a cathode plate).

Test results are shown in Table 1 below.

Evaluation Example 7

4.3V Cut-Off Charging and Discharging Evaluation

Each of the coin cells manufactured according to Examples 1 to 6 and Comparative Examples 1 to 3 was charged with constant-current at a temperature of 25° C. at a rate of 0.05 C until voltage reached 4.3V (vs. Li), and while the voltage was maintained at 4.3V, constant-voltage charging was performed until the current reached 0.02 C. Then, until the voltage reached 3.0 V (vs. Li) constant-current discharging was performed on the coin cells at a rate of 0.05 C. (Formation process)

A lithium battery that had been subjected to the formation process was charged with constant-current at a temperature of 25° C. at a rate of 0.1 C until voltage reached 4.3V (vs. Li), and then, while the voltage was maintained at 4.3V, constant-voltage charging was performed until the current reached 0.02 C. Then, until the voltage reached 3.0 V (vs. Li), constant-current discharging was performed at a rate of 0.1 C. These charging and discharging processes were repeatedly performed 100 times. A capacity retention ratio is represented by Equation 1 below. Charging and discharging test results are shown in Table 1 below.

$$\text{Capacity retention ratio}=[\text{discharge capacity in } 100^{th} \text{ cycle/discharge capacity in } 1^{st}]\times 100 \qquad \text{Equation 1}$$

Evaluation Example 8

4.4V Cut-Off Charging and Discharging Evaluation

Each of the coin cells manufactured according to Examples 1 to 6 and Comparative Examples 1 to 3 was charged with constant-current at a temperature of 25° C. at a rate of 0.05 C until voltage reached 4.4V (vs. Li), and then, while the voltage was maintained at 4.4V, constant-voltage charging was performed until the current reached 0.02 C. Then, until the voltage reached 3.0 V (vs. constant-current discharging was performed on the coin cells at a rate of 0.05 C. (Formation process)

A lithium battery that had been subjected to the formation process was charged with constant-current at a temperature of 25° C. at a rate of 0.7 C until voltage reached 4.4V (vs. Li), and then, while the voltage was maintained at 4.4V, constant-voltage charging was performed until the current reached 0.02 C. Then, until the voltage reached 3.0 V (vs. Li), constant-current discharging was performed at a rate of 0.5 C. These charging and discharging processes were repeatedly performed 100 times. A capacity retention ratio is represented by Equation 1 below. Charging and discharging test results are shown in Table 1 below.

TABLE 1

|  | Binding force [gf/mm] | Bending stress [mN] | Electrode plate Resistance [Ω] | Slurry Stability | L/L [mg/cm²] | Mixture Density [mg/cm³] | Capacity retention ratio [4.3 V cut-off, at 100 cycle] | Capacity retention ratio [4.4 V cut-off, at 100 cycle] |
|---|---|---|---|---|---|---|---|---|
| Example 1 | 1.09 | 2.74 | 10.62 | High | 55.0 | 3.95 | 92.1 | 84.6 |
| Example 2 | 1.13 | 2.97 | 10.50 | High | 55.0 | 3.96 | 92.2 | 84.4 |
| Example 3 | 0.99 | 3.12 | 10.89 | High | 55.1 | 3.95 | 92.1 | 83.9 |
| Example 4 | 1.29 | 3.52 | 11.29 | High | 55.1 | 3.95 | 90.2 | 83.4 |
| Example 5 | 1.35 | 4.17 | 12.20 | High | 55.2 | 3.94 | 90.4 | 83.4 |
| Example 6 | 1.18 | 4.25 | 12.08 | High | 55.1 | 3.94 | 88.1 | 79.9 |
| Comparative Example 1 | 1.12 | 4.97 | 15.78 | Low | 55.0 | 3.95 | 81.0 | 71.9 |
| Comparative Example 2 | 0.87 | 1.97 | 16.30 | Low | 55.0 | 3.94 | 82.0 | 70.2 |
| Comparative Example 3 | 1.11 | 2.21 | 11.98 | High | 55.1 | 3.95 | 81.7 | 71.8 |

As shown in Table 1, the cathodes of the lithium batteries manufactured according to Examples 1 to 6 include a binding force and flexibility at the same time due to the use of a novel binder composition, and accordingly, compared to the lithium batteries manufactured according to Comparative Examples 1 to 3, the lithium batteries have improved energy density and lifespan characteristics.

Since the lithium battery of Comparative Example 1 had a relatively low amount of the second fluoropolymer binder, slurry stability thereof was decreased; since the lithium battery of Comparative Example 2 did not include the non fluoropolymer binder, dispersibility of a conductive agent was decreased, and accordingly, stability of slurry was decreased; and since the lithium battery of Comparative Example 3 did not include the first fluoropolymer binder, flexibility of an electrode plate was decreased, and thus, an electrode plate (specifically, electrode active material layer) was cracked.

Due to the inclusion of a binder composition for a secondary battery including a first fluoropolymer binder including a tetrafluoroethylene polymer binder, a second fluoropolymer binder including a vinylidene fluoride binder, and a non fluoropolymer binder including a repeating unit derived from an acryl monomer and a repeating unit derived from an olefin monomer, a lithium battery may have improved energy density and cyclic characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present embodiments as defined by the following claims. In the present disclosure, the terms "Example," "Evaluation Example" and "Comparative Example" are used to identify a particular example or experimentation and should not be interpreted as admission of prior art.

What is claimed is:

1. A binder composition for a secondary battery, the binder composition comprising:
a first fluoropolymer binder comprising a tetrafluoroethylene polymer binder, wherein an amount of the first fluoropolymer binder is in a range of about 3 weight % to about 27 weight % based on a total weight of the binder composition;
a second fluoropolymer binder comprising a vinylidene fluoride binder; and
a non fluoropolymer binder comprising a repeating unit derived from an acryl monomer and a repeating unit derived from an olefin monomer.

2. The binder composition of claim 1, wherein the first fluoropolymer binder is a copolymer comprising:
a repeating unit derived from a tetrafluoroethylene monomer; and
a repeating unit derived from at least one fluorine-containing monomer selected from the group consisting of vinylidenefluoride, hexafluoropropylene, chloro trifluoroethylene, and perfluoroalkylvinylether.

3. The binder composition of claim 1, wherein the first fluoropolymer binder further comprises a polar functional group.

4. The binder composition of claim 3, wherein the polar functional group of the first fluoropolymer binder comprises at least one selected from the group consisting of a carboxylic acid group, a sulfonic acid group, a phosphoric acid group, a hydroxy group, and an anhydride group, or a salt of the group.

5. The binder composition of claim 1, wherein a weight average molecular weight of the first fluoropolymer binder is in a range of 100,000 g/mol to 1,500,000 g/mol.

6. The binder composition of claim 1, wherein the second fluoropolymer binder is a vinylidene fluoride binder that does not comprise a polar functional group.

7. The binder composition of claim 1, wherein a weight average molecular weight of the second fluoropolymer binder is 300,000 g/mol or more.

8. The binder composition of claim 1, wherein an amount of the second fluoropolymer binder is in a range of about 46 weight % to about 94 weight % based on a total weight of the binder composition.

9. The binder composition of claim 1, wherein an amount of a repeating unit derived from an acryl monomer in the non fluoropolymer binder is in a range of about 1 weight % to about 70 weight %.

10. The binder composition of claim 1, wherein the repeating unit derived from an acryl monomer in the non fluoropolymer binder comprises a nitrile group.

11. The binder composition of claim 1, wherein the repeating unit derived from an olefin monomer in the non fluoropolymer binder comprises a conjugated diene monomer.

12. The binder composition of claim 1, wherein an iodine value of the non fluoropolymer binder is 100 or less.

13. The binder composition of claim 1, wherein a glass transition temperature of the non fluoropolymer binder is in a range of −40° C. to 30° C. g/mol or more.

14. The binder composition of claim 1, wherein an amount of the non fluoropolymer binder is in a range of about 3 weight % to about 27 weight % based on a total weight of the binder composition.

15. A cathode comprising:
   a cathode active material; a conductive agent; and
   the binder composition of claim 1.

16. The cathode of claim 15, wherein an amount of the binder composition is in a range of about 0.5 to about 5 parts by weight based on 100 parts by weight of the cathode active material.

17. The cathode of claim 15, wherein a weight of a cathode mixture per unit area of the cathode is higher than 54.0 mg/cm$^2$.

18. A lithium battery comprising: the cathode of claim 15; an anode; and a separator.

19. The lithium battery of claim 18, wherein a voltage of the lithium battery is 4.0 V or more.

* * * * *

UNITED STATES PATENT AND TRADEMARK OFFICE
CERTIFICATE OF CORRECTION

PATENT NO. : 9,711,796 B2
APPLICATION NO. : 14/562398
DATED : July 18, 2017
INVENTOR(S) : Jung-Ock Yeou et al.

It is certified that error appears in the above-identified patent and that said Letters Patent is hereby corrected as shown below:

In the Specification

In Column 3 at Line 13, Change "electrolyic" to --electrolytic--.

In Column 3 at Line 29, Change "tetrafluorothylene" to --tetrafluoroethylene--.

In Column 4 at Line 38, Change "fumareate," to --fumarate,--.

In Column 4 at Line 39 (First Occurrence), Change "fumareate," to --fumarate,--.

In Column 4 at Line 39 (Second Occurrence), Change "fumareate," to --fumarate,--.

In Column 4 at Line 39 (Third Occurrence), Change "fumareate," to --fumarate,--.

In Column 4 at Line 40 (First Occurrence), Change "fumareate," to --fumarate,--.

In Column 4 at Line 40 (Second Occurrence), Change "fumareate," to --fumarate,--.

In Column 4 at Line 46, Change "2-acrylamid-" to --2-acrylamide- --.

In Column 4 at Line 50, Change "phosphate2-" to --phosphate-2- --.

In Column 4 at Line 60, Change "di2-" to --di-2- --.

In Column 5 at Line 8, Change "diethyleneglycol mono(meth)" to --diethyleneglycolmono(meth)--.

In Column 5 at Line 29, Change "mole %" to --mol %--.

In Column 6 at Line 21 (First Occurrence), Change "vinylidine" to --vinylidene--.

Signed and Sealed this
Third Day of April, 2018

Andrei Iancu
*Director of the United States Patent and Trademark Office*

In Column 6 at Line 21 (Second Occurrence), Change "vinylidine" to --vinylidene--.

In Column 6 at Lines 22-23, Change "vinylidine" to --vinylidene--.

In Column 6 at Line 24, Change "vinylidine" to --vinylidene--.

In Column 6 at Line 30, Change "vinylidine" to --vinylidene--.

In Column 7 at Lines 30-31, Change "trimethylolpropantri(meth)" to --trimethylolpropanetri(meth)--.

In Column 13 at Line 36 (approx.), Change "$Li_xCo_{1-y-z}Ni_yM_zO_{2-+}X_\alpha$" to --$Li_xCo_{1-y-z}Ni_yM_zO_{2-\alpha}X_\alpha$--.

In Column 13 at Line 40 (approx.), Change "$Li_xCo_{2-y}M_yO_{4-+}X_\alpha$" to --$Li_xCo_{2-y}M_yO_{4-\alpha}X_\alpha$--.

In Column 13 at Line 66, Change "polymethylmetacrylate," to --polymethylmethacrylate,--.

In Column 15 at Line 43, Change "polymethylmetacrylate," to --polymethylmethacrylate,--.

In Column 15 at Line 65, Change "α-butyrolactone," to --γ-butyrolactone,--.

In Column 15 at Line 66, Change "dioxorane," to --dioxolane,--.

In Column 15 at Line 66, Change "methyldioxorane," to --methyldioxolane,--.

In the Claims

In Column 22 at Lines 33-34, In Claim 2, change "chloro trofluoroethylene," to --chlorotrifluoroethylene,--.